United States Patent [19]

Upah

[11] Patent Number: 5,951,158
[45] Date of Patent: Sep. 14, 1999

[54] ILLUMINATED EARRINGS

[76] Inventor: Sally Upah, 7615 Valmont St., Tujunza, Calif. 91042

[21] Appl. No.: 09/037,616
[22] Filed: Mar. 10, 1998
[51] Int. Cl.$^6$ .................................................. F21V 8/00
[52] U.S. Cl. ................................. 362/571; 362/104
[58] Field of Search ............................. 362/104, 571, 362/565, 806

[56] References Cited

U.S. PATENT DOCUMENTS

| | | | |
|---|---|---|---|
| 4,009,381 | 2/1977 | Schreiber et al. | 362/104 X |
| 4,719,544 | 1/1988 | Smith | 362/104 |
| 5,018,053 | 5/1991 | Belknap et al. | 362/104 |

*Primary Examiner*—Stephen Husar
*Attorney, Agent, or Firm*—Goldstein & Canino

[57] ABSTRACT

An earring, comprising a main decorative body, a shaft extending from the main decorative body, a backing plate which selectively secures to the main decorative body, and a light source within the main decorative body. Light carrying fiber optic strands extend from the main decorative body, each having a proximal end and a distal end. The proximal end is in communication with the light source such that light from the light source enters the proximal end of the fiber optic strands. Light propagating spheres are attached to the distal end of the light carrying strands. A power source is contained within the backing plate, and supplies power to the light source when the backing plate is attached to the shaft.

7 Claims, 2 Drawing Sheets

ILLUMINATED EARRINGS

BACKGROUND OF THE INVENTION

The invention relates to illuminated earrings. More particularly, the invention relates to earrings which have a self contained power source and light source. The earrings have a plurality of light carrying fiber optic strands for dispersing light from the light source.

A conventional earring has a decorative body, a shaft that extends through an opening in the ear, and a backing plate which mounts to the shaft opposite the decorative body to secure the earring onto the ear.

Numerous designs have developed over the years for earrings. Some general categories include stud earrings, hoop earrings, and earrings which have dangling ornaments.

While these units may be suitable for the particular purpose employed, or for general use, they would not be as suitable for the purposes of the present invention as disclosed hereafter.

SUMMARY OF THE INVENTION

It is an object of the invention to produce an earring which contains a light source for illuminating said earring.

It is another object of the invention to provide an earring which employs a plurality of light carrying fiber optic strands, for dispersing light from the light source. The fiber optic strands disperse light at their distal end. Thus, the distal ends may be located remote from the earring body, so that the distal ends provide illumination at points distinct from the earning body.

It is a further object of the invention that the light carrying fiber optic strands may be placed in the hair immediately adjacent to the ear containing the earring. The fiber optic strands create the appearance of numerous points of light emanating from the hair.

It is a still further object of the invention to provide an illuminated earring which provides a power source within the backing plate, so that the light source is activated when the earring is mounted in the ear.

The invention is an earring, comprising a main decorative body, a shaft extending from the main decorative body, a backing plate which selectively secures to the main decorative body, and a light source within the main decorative body. Light carrying fiber optic strands extend from the main decorative body, each having a proximal end and a distal end. The proximal end is in communication with the light source such that light from the light source enters the proximal end of the fiber optic strands. Light propagating spheres are attached to the distal end of the light carrying strands. A power source is contained within the backing plate, and supplies power to the light source when the backing plate is attached to the shaft.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
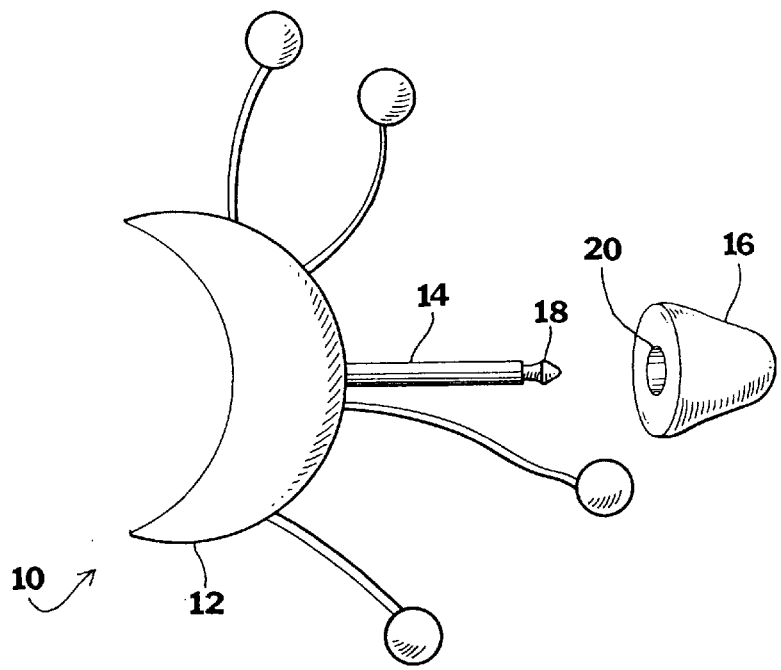
FIG. 1 is a side elevational view, illustrating the invention with the backing plate removed.

FIG. 1 illustrates an earring 10 having a main decorative body 12, a shaft 14, and a backing plate 16. The decorative body 12 may be made in a variety of shapes, to provide a decorative and interesting appearance. The decorative body 12 may be opaque, or may be translucent according to the particular goals of the invention disclosed hereinafter.

Figure 2:
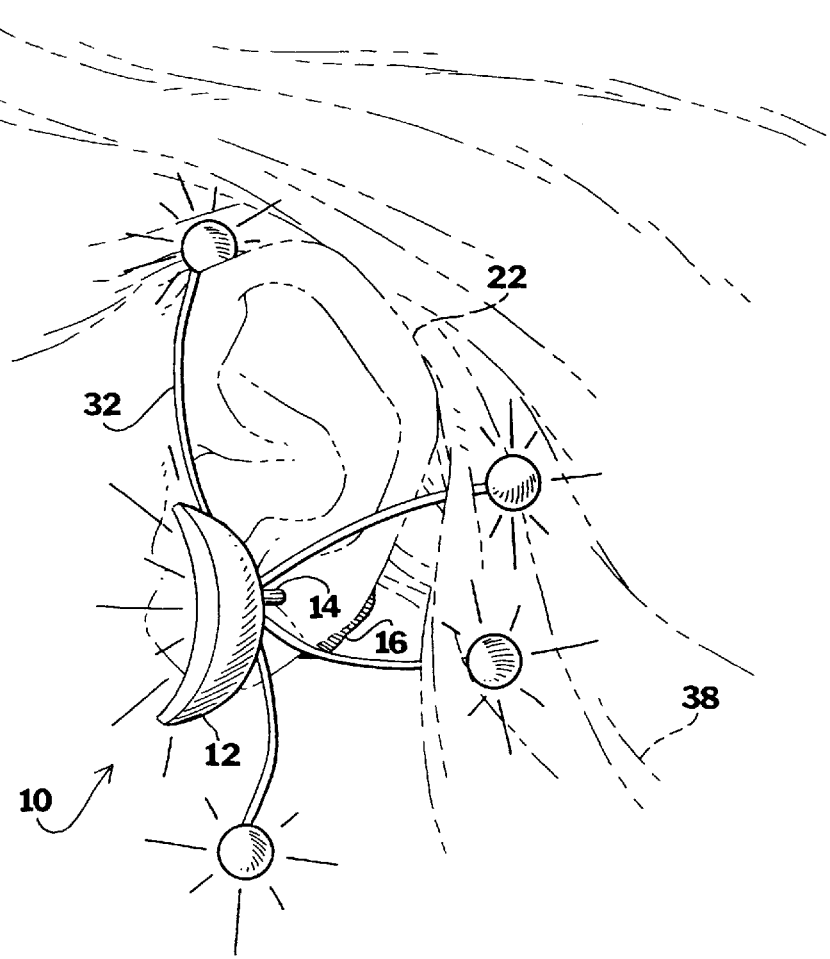
FIG. 2 is a side elevational view, illustrating the invention mounted in place in an ear.

The shaft 14 extends from the main decorative body 12, and has a plug 18 opposite the main decorative body 12. The backing plate 16 has a receptacle 20 for selectively engaging the plug 18 on the shaft 14 and securing thereto. Referring briefly to FIG. 2, the earring 10 has been attached in an ear 22, wherein the shaft 14 extends through the ear 22. The backing plate 16 secures to the shaft 14 and in turn secures the earring 10 onto the ear 22 by trapping the ear 22 between the decorative body 12 and the backing plate 16.

Figure 3:
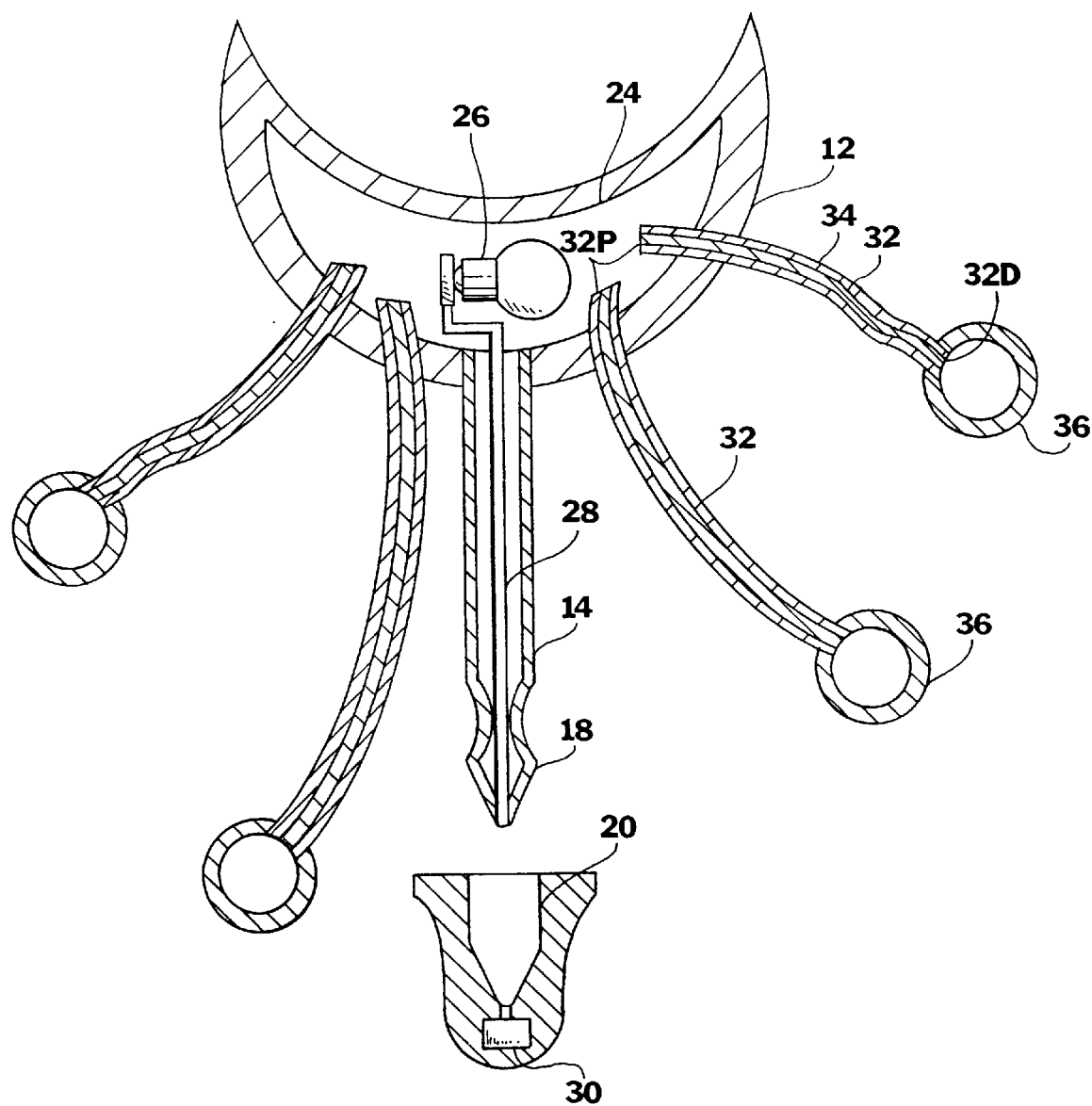
FIG. 3 is a cross sectional view of the invention.

Referring to FIG. 3, the main decorative body 12 has a decorative body interior 24, where a light source 26, namely a light bulb, LED or the like, is located. A power conduit 28 extends from the light source 26 to the plug 18, through the shaft 14. A power source 30 such as a battery is located in the backing plate 16 adjacent to the receptacle 20, and is in communication with the receptacle 20. Thus, power is supplied to the light source 26 from the power source 26 through the shaft 14. The shaft 14 may itself act as an electrical conductor to complete a circuit between the power source 30 and light source 26. The light source 26 may be activated and illuminated by attaching the backing plate 26 to the shaft 14, and deactivated by detaching the same.

Emanating from the main decorative body 12 are light carrying fiber optic strands 32. The light carrying fiber optic strands 32 have a proximal end 32P and a distal end 32D. The proximal end 32P is in communication with the light source 26, wherein light from the light source 26 enters the fiber optic strands 32 at the proximal end 32P and travels toward the distal end 32D where the light exits. The distal end 32D is opposite the main decorative body 12.

The fiber optic strands 32 may be encased in a sheath 34. The sheath 34 is preferably made of a rubber like material that is colored to match the wearer's hair so as to be inconspicuous when adorned, or should be at least darkly colored so as to be less conspicuous when in dimly lit surroundings. A light propagating sphere 36 may be mounted to the light carrying fiber optic strands 32 opposite the main decorative body 12 at the distal end 32D to disperse the light exiting the light carrying fiber optic strands 32.

Referring back to FIG. 2, the earring 10 has been adorned by a user or wearer, having hair 38. In the embodiment shown, the main decorative housing 12 of the earring 10 is shaped like a crescent moon. In this embodiment, the main decorative body 12 is partially translucent, and thus emanates light from the main decorative body 12. The earring 10 is mounted in the ear 22. The light carrying fiber optic strands 32 extend from the main decorative body 12 to locations distinct from the ear 22. The strands 32 are distributed throughout the hair 38 at various locations, such that some of the light propagating spheres 36 seem to be floating in the hair, with no apparent power source. Encasing the strands 32 with the sheath further helps provide this effect.

In the embodiment illustrated in FIG. 2, the main decorative body 12 is partially translucent and thus emanates some light, as discussed previously. However, a different effect is obtained by providing an opaque main decorative body 12. The opaque main decorative body 12 is thus easily obscured by darkness, which further emphasizes the light that emanates from the light propagating spheres 36, or from the light carrying fiber optic strands 32 themselves if the light propagating spheres 36 are not present.

In conclusion, herein is presented an earring which has a main decorative body which contains a light source that produces light which is carried to locations distinct from the main decorative body by light carrying fiber optic strands. Power is supplied to the light source by a power source, which is present in a backing plate that is attached to the main decorative body by means of a shaft, which extends through the ear of the wearer to secure the earring thereto.

What is claimed is:

1. An earring, for use by a wearer, the wearer having an ear, comprising:

a main decorative body;

a shaft extending from the main decorative body for extending through the ear of the wearer;

a backing plate, for selectively engaging the shaft opposite the main decorative body for securing the earring to the ear; and a light source, contained within the main decorative body, for propagating light from the main decorative body;

a plurality of light carrying fiber optic strands, each strand having a proximal end and a distal end, the proximal ends in communication with the light source so that light from the light source enters the proximal ends, the light carrying fiber optic strands extending from the main decorative body so that the distal ends may be located at locations distinct from the ear, the light exits the light carrying fiber optic strands at the distal ends, wherein at least one of the strands further comprises a light propagating sphere at the distal end of the fiber optic strand.

2. The earring as recited in claim 1, wherein at least one of the fiber optic strands further has a sheath which encases said fiber optic strand.

3. The earring as recited in claim 2, further comprising a power source, said power source located in the backing plate.

4. The earring as recited in claim 3, wherein the shaft further comprises a plug that is opposite the main body and a power conduit which extends through the shaft and connects with the light source; and wherein the backing plate further comprises a receptacle which selectively engages the plug and connects the power source to the light source by connecting the power source with the power conduit.

5. The earring as recited in claim 4, wherein the shaft acts as an electrical conductor to complete a circuit between the power source and light source.

6. An earring illumination method, for use by a wearer having an ear and hair, using an earring having a main decorative body, a shaft extending from the main decorative body, a backing plate which selectively mounts to the shaft, a light source within the main decorative body, and a plurality of light carrying fiber optic strands extending from the main body that are in communication with the light source, comprising the steps of:

mounting the earring in the ear by extending the shaft through the ear;

distributing the light carrying fiber optic strands at different locations in the hair;

securing the earring to the ear; and illuminating the light source.

7. The earring illumination method as recited in claim 6, wherein the steps of securing the earring to the ear and illuminating the light source is performed by securing the backing plate to the shaft.

* * * * *